United States Patent [19]
Lupke

[11] Patent Number: 5,383,998
[45] Date of Patent: Jan. 24, 1995

[54] APPARATUS FOR MODIFYING CORRUGATED OR RIBBED PIPE TO HAVE A SMOOTH OUTER WALL

[75] Inventor: Manfred A. A. Lupke, Thornhill, Canada

[73] Assignee: Corma Inc., Ontario, Canada

[21] Appl. No.: 242,241

[22] Filed: May 13, 1994

Related U.S. Application Data

[62] Division of Ser. No. 977,762, Nov. 17, 1992, Pat. No. 5,330,600.

[30] Foreign Application Priority Data

Nov. 22, 1991 [CA] Canada .................................. 2056060

[51] Int. Cl.⁶ .............................................. B32B 31/20
[52] U.S. Cl. .................... 156/242; 156/244.13; 156/244.15; 156/244.23; 156/244.24; 156/244.25; 156/500; 156/245; 264/508; 264/566; 425/112; 425/113; 425/133.1; 425/325; 429/327
[58] Field of Search ............... 156/244.13, 244.14, 156/244.15, 244.23, 244.25, 242, 245, 500; 264/508, 566; 425/112, 113, 133.1, 325, 327

[56] References Cited

U.S. PATENT DOCUMENTS

| 3,981,663 | 9/1976 | Lupke | 425/326 B |
| 3,994,644 | 11/1976 | Hegler et al. | 156/244.13 |
| 4,021,178 | 5/1977 | Braun | 425/325 |
| 4,226,580 | 10/1980 | Lupke | 425/504 |
| 4,381,276 | 4/1983 | Hegler et al. | 156/244.14 |
| 4,712,993 | 12/1987 | Lupke | 425/466 |
| 5,023,029 | 6/1991 | Lupke | 264/508 |
| 5,124,109 | 6/1992 | Drossbach | 264/508 |
| 5,139,730 | 8/1992 | Holso et al. | 264/508 |
| 5,186,878 | 2/1993 | Lupke | 264/508 |

Primary Examiner—Caleb Weston
Attorney, Agent, or Firm—Beveridge, DeGrandi, Weilacher & Young

[57] ABSTRACT

Annularly or helically ribbed or corrugated semi-rigid thermoplastic pipe is modified to have a smooth outer wall. The ribbed or corrugated pipe is passed through a heated sleeve to squash and smooth the outer profile of corrugated pipe or bend over ribs of ribbed pipe and mold a smooth outer skin of the pipe. Apparatus for forming the modified pipe includes a travelling mold tunnel for the production of ribbed or corrugated pipe and a smoothing sleeve downstream thereof. The smoothing sleeve has a heater to heat it sufficiently to mold the smoother outer skin.

15 Claims, 7 Drawing Sheets

APPARATUS FOR MODIFYING CORRUGATED OR RIBBED PIPE TO HAVE A SMOOTH OUTER WALL

This application is a divisional of application Ser. No. 07/977,762, filed Nov. 17, 1992, U.S. Pat. No. 5,330,600.

BACKGROUND OF THE INVENTION

1. Field of the Invention

This invention relates to a method of modifying the profile of rigid or semi-rigid pipe formed of thermoplastic material, or rigid or semi-rigid, multi-walled plastic pipe and a method and apparatus for the manufacture of such pipe.

2. Description of the Prior Art

Rigid or semi-rigid plastic pipes have a variety of uses not least among which are uses as electrical conduit and drainage pipe which are frequently buried and may therefore be under considerable crushing pressures.

When plastic pipe was first utilized for such above identified uses, it tended to have a single, rather thick, smooth wall to withstand pressure.

Pipe having annular or helical corrugations in its wall was found to have advantages in withstanding pressure and the manufacture of such pipe was described and claimed in U.S. Pat. No. 3,981,663 issued to Manfred Lupke on Sep. 21, 1976. This patent is merely exemplary of a large number of patents relating to corrugated single-walled plastic tube and its production.

For various reasons including greater strength and, for smooth unfouled flow in drainage pipe, it became conventional to utilize double-walled corrugated pipe in which the outer wall was corrugated and the inner wall was smooth. Such pipe and a method and apparatus for its production are described in U.S. Pat. No. 4,226,580 issued to Gerd Lupke on Oct. 7, 1980. Again this patent is merely exemplary of the prior art.

More recently, the use of ribbed pipe has become popular for similar uses. Ribbed pipe comprises a single wall having annular or helical ribs upstanding therefrom. Such pipe may be made with considerable strength and for some purposes it may have advantages over double-walled, corrugated pipe. The disclosure of U.S. Pat. No. 4,712,993 issued Dec. 15, 1987 to Manfred Lupke is exemplary of ribbed pipe and one method of its manufacture.

The outer profile of both ribbed and corrugated pipe is ridged and, for some pipes, may cause appreciable inconvenience. For example, ribbed or corrugated pipe of large diameter having prominent ribs or corrugations may be difficult to drag over the ground due to the great frictional affect of the ribs or corrugations. It is known to the applicant to form corrugated pipe in a mold such as to initially mold corrugations with a somewhat flattened crest. Such flat topped corrugations may slightly mitigate any problems arising in stacking or moving tube. Nevertheless, the corrugations are still present and still may inhibit easy movement and stacking, and, indeed, the flat topped corrugations may even slightly reduce some of the advantages of corrugated pipe. Moreover, dirt and other detritus may accumulate in the troughs.

Thus, there appears to be problems of, firstly the provision of strength and, secondly, the easy maneuverability of large diameter pipe. Either problem alone may be mitigated by existing technology but, together, the solutions to one problem seem irreconcilable with solution to the other problem.

Generally, the problems are greater for ribbed pipe which was developed, inter alia, for the strength imparted by steep, deep annular or helical ribs. Any mobility difficulties are correspondingly greater. Moreover ribbed pipe does not have a second skin separated from the first skin by air gaps. Such skins as are present in corrugated pipe may have advantages in insulation and may also provide additional surety against puncture leading to pipe leakage where this is desirable. Such advantages of insulation and insurance against puncture have, hitherto, not been possible for ribbed pipe.

The present inventor has addressed these problems.

SUMMARY OF THE INVENTION

According to the invention there is provided a method for forming modified double-walled, thermoplastic pipe having a substantially smooth outer surface and a substantially smooth inner surface, comprising passing pipe having a smooth inner and a profiled outer surface having a projecting profile of diameter greater than a desired outer diameter of Pipe to be formed, past means for distorting the projecting profile such as past at least one roller or through a sleeve having an internal diameter corresponding to the desired outer diameter of pipe to be formed, the pipe having a profiled outer surface being heated sufficiently for molding the profile to form a smooth pipe outer surface corresponding in diameter to the internal diameter of the sleeve. The pipe having a smooth inner surface and a profiled outer surface may be double-walled corrugated pipe or annularly or helically ribbed pipe. When the pipe is ribbed pipe the or each rib may comprise a rib root portion having a diameter generally corresponding to the diameter of a required double-walled pipe, and a tip portion of a thickness to form an outer wall of the required double-walled pipe to be formed and a depth corresponding at least to the distance between adjacent ribs or helices.

When the pipe having a profiled outer surface is preformed it may be initially passed through a heating chamber to soften it to an extent that it may be deformed.

When the pipe is double-walled corrugated pipe the crests of the corrugations which project beyond the diameter of the sleeve or the diameter defined by the rollers, and hence beyond the diameter of required pipe, may have a volume which corresponds to the volume to be filled between the crests to form a continuous smooth outer surface.

The invention also includes double-walled pipe having an inner and an outer wall having annular or helical ribs or corrugations therebetween.

The invention also includes apparatus for forming modified double-walled ribbed pipe having a smooth inner wall and an outer wall with ribs extending therebetween comprising an extrusion die having an elongate extrusion nozzle coaxial about an elongate mandrel; a travelling mold tunnel having a mold face aligned with the extrusion nozzle and arranged to receive a parison of thermoplastic material from the nozzle on the mold face, to mold an outer face of an intermediate single-walled pipe formed therein, the configuration of the mold face having annular grooves, the grooves having a thickness and depth to mold an upstanding rib of the said single-walled pipe, the rib comprising a rib root portion having a diameter generally corresponding to the diameter of a required doubled-walled pipe, and a tip portion of a thickness to form an outer wall of the required doubled-walled pipe and a depth corresponding at least to the distance between adjacent ones of said grooves; a forming plug within the mold tunnel to mold said single-walled pipe between the plug and the mold face; a sleeve downstream of the travelling mold tunnel to mold an outer wall of required double-walled pipe, the sleeve having an internal diameter generally corresponding to that of the required double-walled pipe, the sleeve being located coaxial with the mold tunnel to receive single-walled ribbed pipe therefrom whereby the tip rib portions are bent into the form of a smooth outer wall. In this case pipe issuing from the travelling mold tunnel may be sufficiently soft for deformation without the need for a heating chamber. Each bent over tip rib portion may meld with an adjacent upstream rib root portion to form an uninterrupted outer skin or the outer skin may be interrupted by grooves between the tip of each bent over portion and the adjacent rib portion.

The invention also includes apparatus for making modified double-walled pipe having a smooth inner and a smooth outer surface comprising an extrusion die having first and second elongate extrusion nozzles coaxial about an elongate mandrel and the first nozzle being coaxial about the second nozzle which extends downstream out of the first nozzle; a travelling mold tunnel having a mold face aligned with the extrusion nozzle, the tunnel being arranged to receive a first parison of thermoplastic material from the first nozzle on the mold face to mold an outer wall of intermediate double-walled corrugated pipe, the mold face being configured for molding corrugated pipe having troughs and projecting profiles, the tunnel also being arranged to receive within the outer wall of the intermediate pipe a second parison from the second nozzle to mold an inner wall of the intermediate pipe, the mold tunnel including means to bias the first parison against the mold face and a sizing plug to mold an inner surface of the inner wall; a sleeve to mold an outer wall of required double-walled pipe, the sleeve having an internal diameter generally corresponding to that of the required double-walled pipe, the sleeve being located downstream of the mold tunnel and coaxial with it to receive intermediate pipe therefrom whereby the profiles are deformed into the form of a smooth outer wall. Again, pipe issuing from the mold tunnel may be sufficiently soft for deformation without the need for a heating chamber.

The travelling mold tunnel may, of course, be of any suitable type, e.g., a two track tunnel or a one track tunnel having mold blocks which are hinged together.

Whether preformed pipe is softened in a heating chamber or whether soft pipe from a travelling mold tunnel is modified according to the invention a cooling chamber may be provided to cool the modified pipe.

BRIEF DESCRIPTION OF THE DRAWINGS

Embodiments of the invention will now be described by way of example with reference to the accompanying drawings, in which.

DETAILED DESCRIPTION OF PREFERRED EMBODIMENTS

Figure 1:
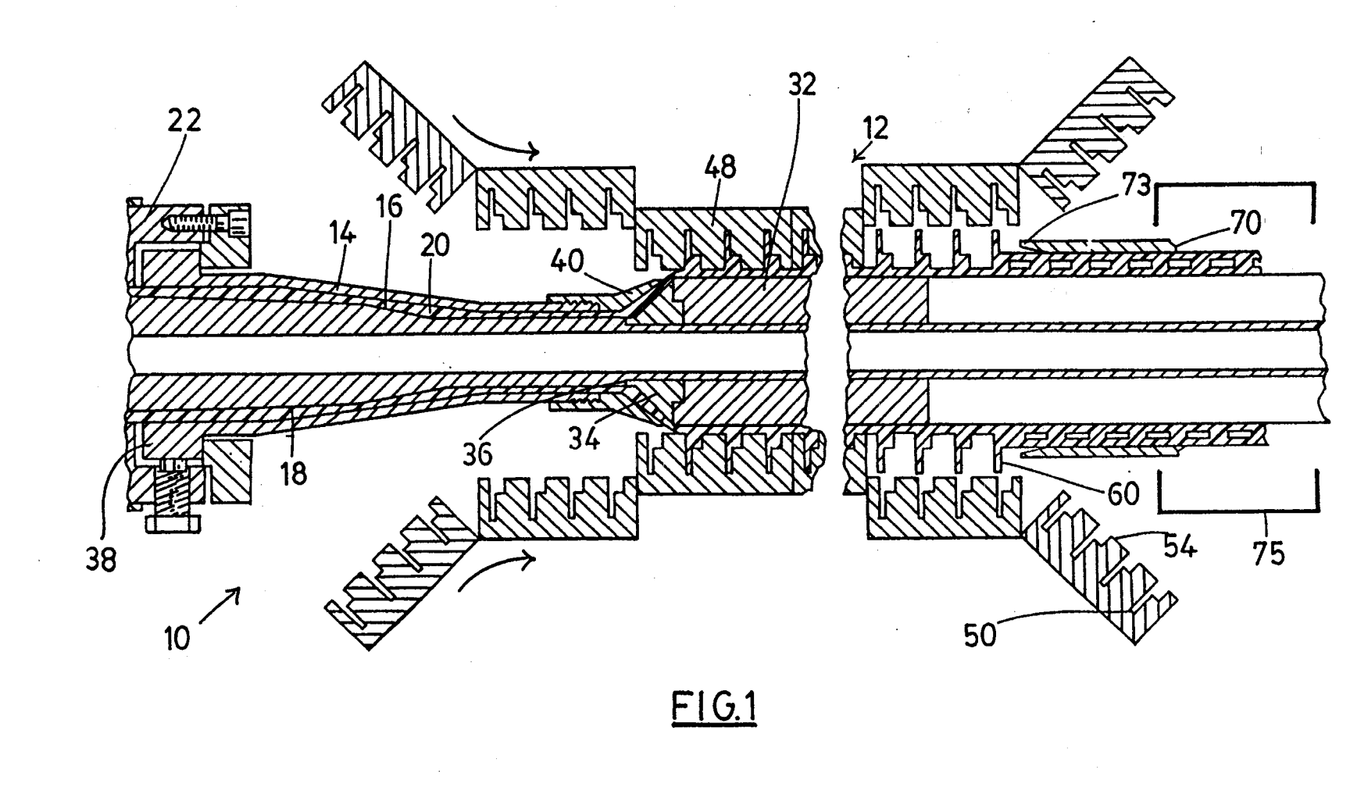
FIG. 1 is a sketch of apparatus according to the invention for forming double-walled ribbed pipe.

Apparatus for forming ribbed pipe 58 shown in FIG. 1 for delivering extrudate, e.g. polyvinyl chloride, from extrusion die 22 to a travelling mold 12, comprises an elongated extrusion nozzle 14 located coaxially about an elongate mandrel 16 and a carrier member 18 to define an annular channel 20 for extrudate. The travelling mold, although illustrated as a two track mold, may be of any convenient type.

The mandrel 16 is clamped to extrusion die 22 so that extrudate from extrusion passage of the extrusion die 22 may flow into the annular channel 20. The extrusion passage of circular cross section may join the annular channel 20 through a straight-through channel in the outer surface of the mandrel 16, which outer surface, in that region, substantially fits a bore of the extrusion die 22. Although a straight-through channel is often practical for many purposes, the present invention is not intended to exclude the use of side-feed extrusion dies.

Mandrel 16 may form a shaped sleeve around an elongated tubular carrier member 18 which projects out of the mandrel 16 at each end or mandrel 16 may itself extend forwardly as carrier member 18. Forwardly of mandrel 16, in the region of entry to travelling mold 12, tubular member 18 extends though an axial bore of a 20 conically shaped exit mandrel 34.

Exit mandrel 34 is provided to direct extrudate outwardly against the travelling tunnel and may be located in position by stops 36 of tubular member 18 to its rear, and by a lock nut screw threadedly engaging the forward end of tubular member 18 which projects into travelling mold tunnel 12. A sizing plug 32 for sizing and smoothing the inside surface of formed tube is suitably provided between the nut and exit mandrel 34.

Immediately downstream of the extrusion die 22, elongated extrusion nozzle 14 is connected to extrusion die 22 to register with an exit port of the extrusion die 22. A circumferential flange 38 at the upstream end of nozzle 14 abuts the extrusion die 22 and is held in place by an annulus which is bolted to the extrusion die 22 by bolts. The nozzle 14 may be centered with respect to mandrel 16 by a centering bolt.

A funnel shaped member 40 is carried by a downstream screw-threaded portion of nozzle 14 to be coaxial with exit mandrel 34 and forming with exit mandrel 34 a diverging exit channel for extrudate. The divergent exit channel is generally cone-shaped.

Figure 2:
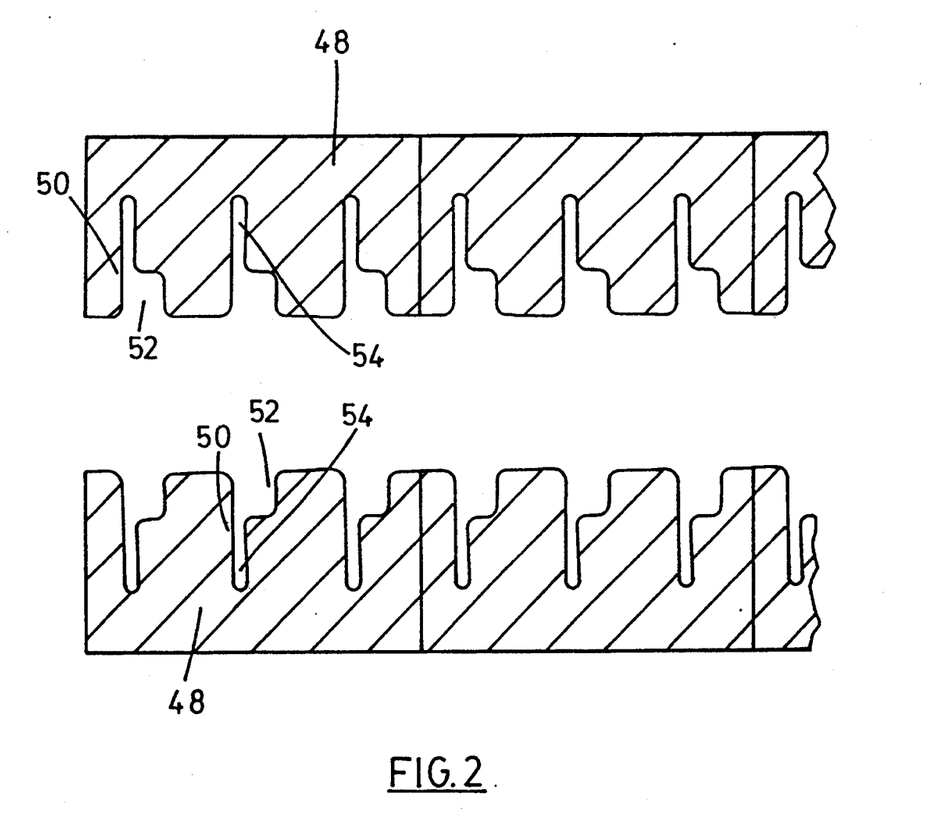
FIG. 2 is a detail of an enlarged mold block of the apparatus of FIG. 1.
Figure 3:
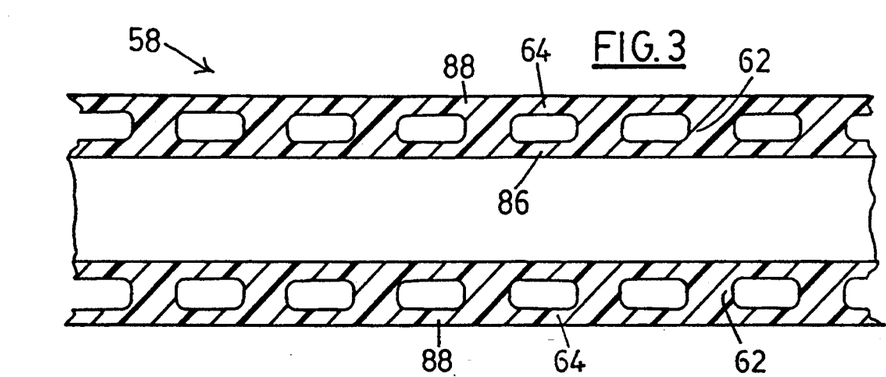
FIG. 3 is a sketch of a longitudinal section of pipe according to the invention.

The exemplary travelling mold may be made up of two conveyors of cooperating mold blocks 48 which, on cooperating runs of the conveyors, come together to form a mold tunnel. Each mold block is provided with spaced grooves 50 and ridges to form, in the tunnel, annular or helical grooves 50 and ridges 54. Each groove 50 molds a rib 60 of the resulting intermediate pipe 58 and each ridge molds a pipe wall portion between the ribs (or turns of the helix, as the case may be). A one track travelling mold having hinged mold blocks is also possible.

As shown, ribs 60 and corresponding grooves 50 each comprise a root portion 62, 52 and a tip portion 64, 54. The rib root portion 62 (and groove root portion 52) are of such a height as to define the distance between the two skins of the required double-walled pipe. The height of tip rib portion 64 (and groove tip portion 54) correspond to the distance between ribs 60, i.e. to the width of the ridge between grooves 50. The tip rib portion 64 may be larger than the distance between the ribs 50 but not shorter.

Downstream of travelling mold tunnel 12, a sleeve 70 is arranged coaxially with it to receive pipe formed in the mold tunnel. Sleeve 70 has a diameter such as to allow passage of the root rib portions 62 thereinto while bending over the tip rib portions 64 to form an outer wall of the pipe to be formed. Suitably, sleeve 70 has a chamfered entrance 73 to allow easy entry of pipe 58. Alternatively, a flared entrance to the sleeve may be provided. Sleeve 70 may itself be heated if desired to a temperature sufficient to soften and meld the bentover tip rib portions 64. Heater 72 is shown diagrammatically but may be of any suitable type.

Figure 4:
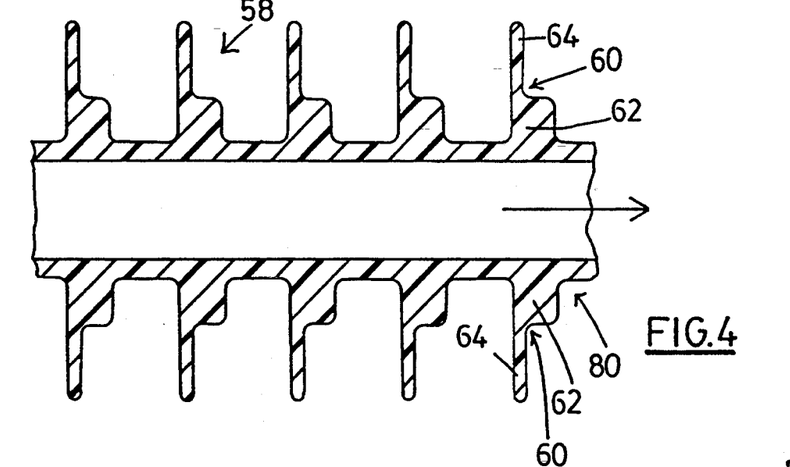
FIG. 4 is a sketch of a longitudinal section of intermediate single-walled pipe formed in the mold tunnel before treatment to form the outer wall.

In operation, a parison of thermoplastic material is extruded from the extrusion die 22 through the extrusion nozzle 14 and diverging exit channel into the space between plug 32 and the grooves 50 and ridges of the mold tunnel 12 to mold an intermediate single-walled ribbed tube 58 as, for example, shown in FIG. 4. The rib root portions 62 are thicker than the rib tip portions 64 which are located towards the upstream side of the root portions 62.

Figure 5:
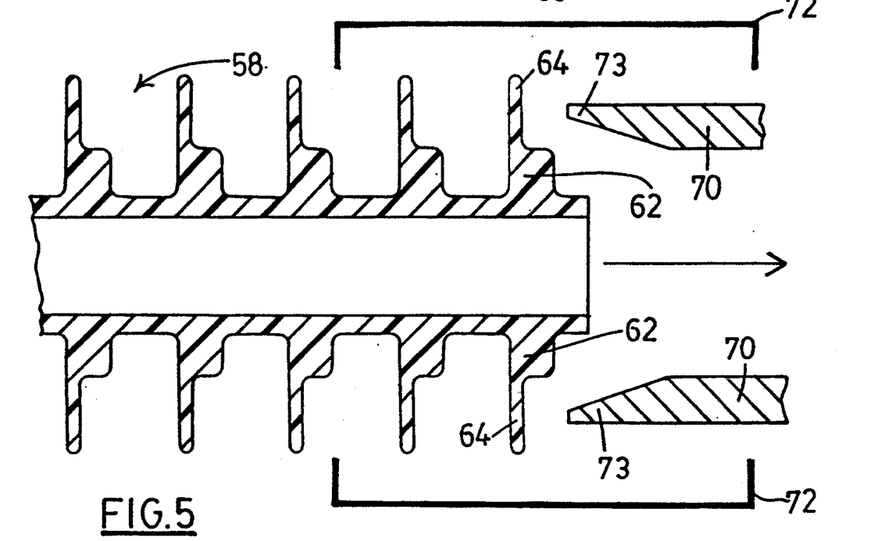
FIGS. 5, 6 and 7 are diagrammatic sketches showing the steps of forming the double-walled pipe from the single-walled pipe of FIG. 3.
Figure 6:
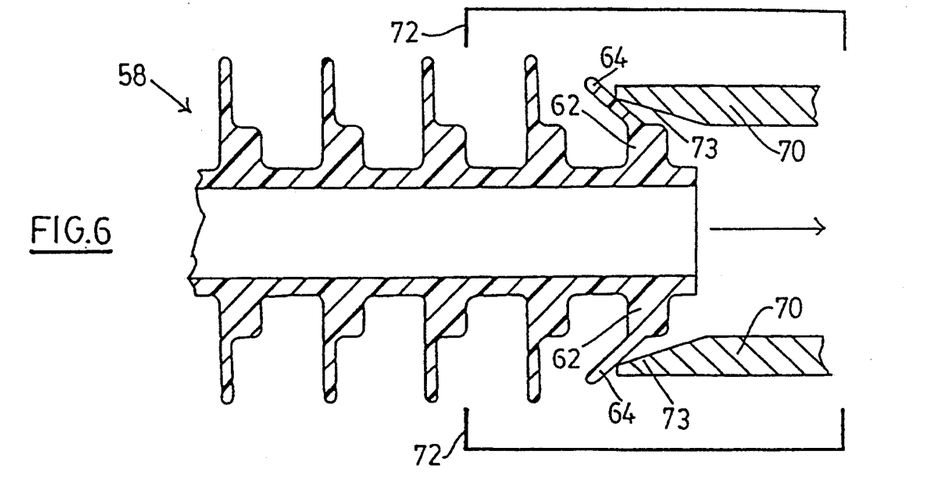
Figure 7:
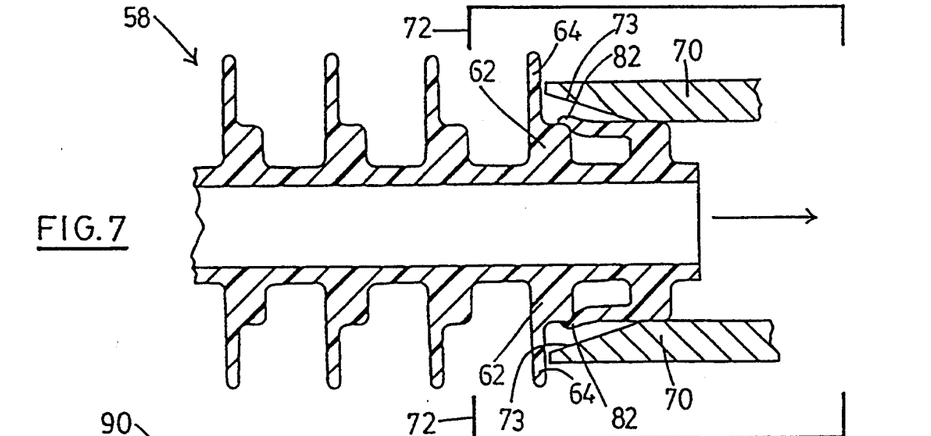

The intermediate single-walled pipe 58 or preset preformed pipe passes into sleeve 70 as shown for example in FIGS. 5, 6 and 7. If the pipe is preformed and preset corrugated ribbed tube it is necessary to soften it sufficiently for deformation. A heating chamber 72 is provided for this purpose. It may be convenient to provide such a heating chamber 72 even when pipe is directly received from a travelling mold tunnel. As the pipe enters sleeve 70, the annular tip rib portions bend over through the position shown in FIG. 6 into the position shown in FIG. 7 within the sleeve. Once within the sleeve 70 the tip rib portions may initially form a somewhat crumpled or fluted outer pipe wall attached only through the integral connection between each root rib portion 62 and the specific tip rib portion 62 associated with it. A heater may be provided to supply heat to sleeve 70 sufficient to maintain suitable softness of the tip rib portions 64 to mold the crumpled wall into a firm skin and to weld or adhere the tip of each tip rib portion 64 to the adjacent root rib portion immediately upstream from it. The length of sleeve 70 may be such that pipe emerging from the downstream end of sleeve 70 is sufficiently set as to maintain its shape. However, it is convenient if a cooling chamber 75 is provided.

Figure 8:
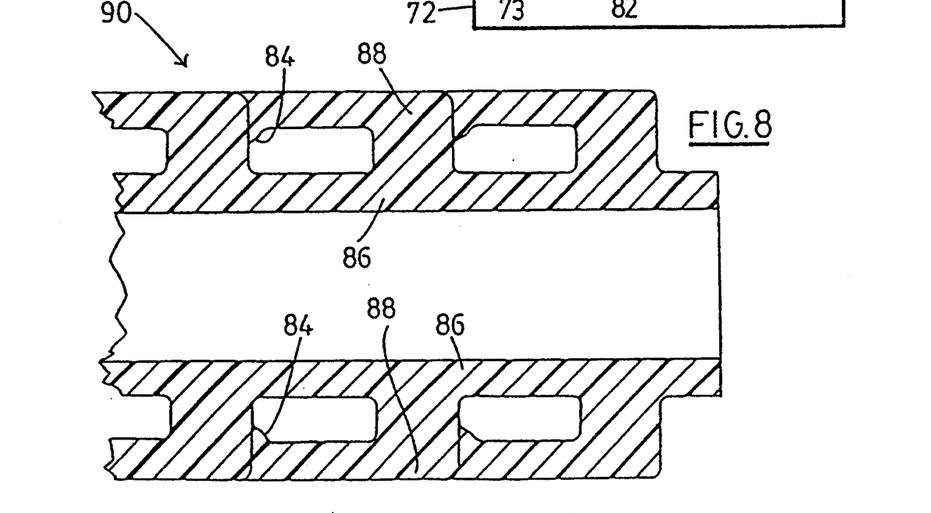
FIG. 8 shows a detail of the inner and outer walls and ribs of the formed double-walled pipe.

While the height of each tip rib portion 64 need only be sufficient to span the distance between rib root portions 62, it may be convenient that the height is a little greater than the minimum required. When the height of tip rib portions 64 is greater than required, each tip portion rib tip will initially overlay the adjacent root rib portion as shown at 82 in FIG. 6. As the intermediate tube fully enters the sleeve 70 this overlay will be smoothed by the inner surface of sleeve 70 possibly resulting in a slight bulge 84 of material between the inner wall 86 and the outer wall 88 of the finally formed tube 90 of which a section is shown in FIG. 8.

Figure 9:
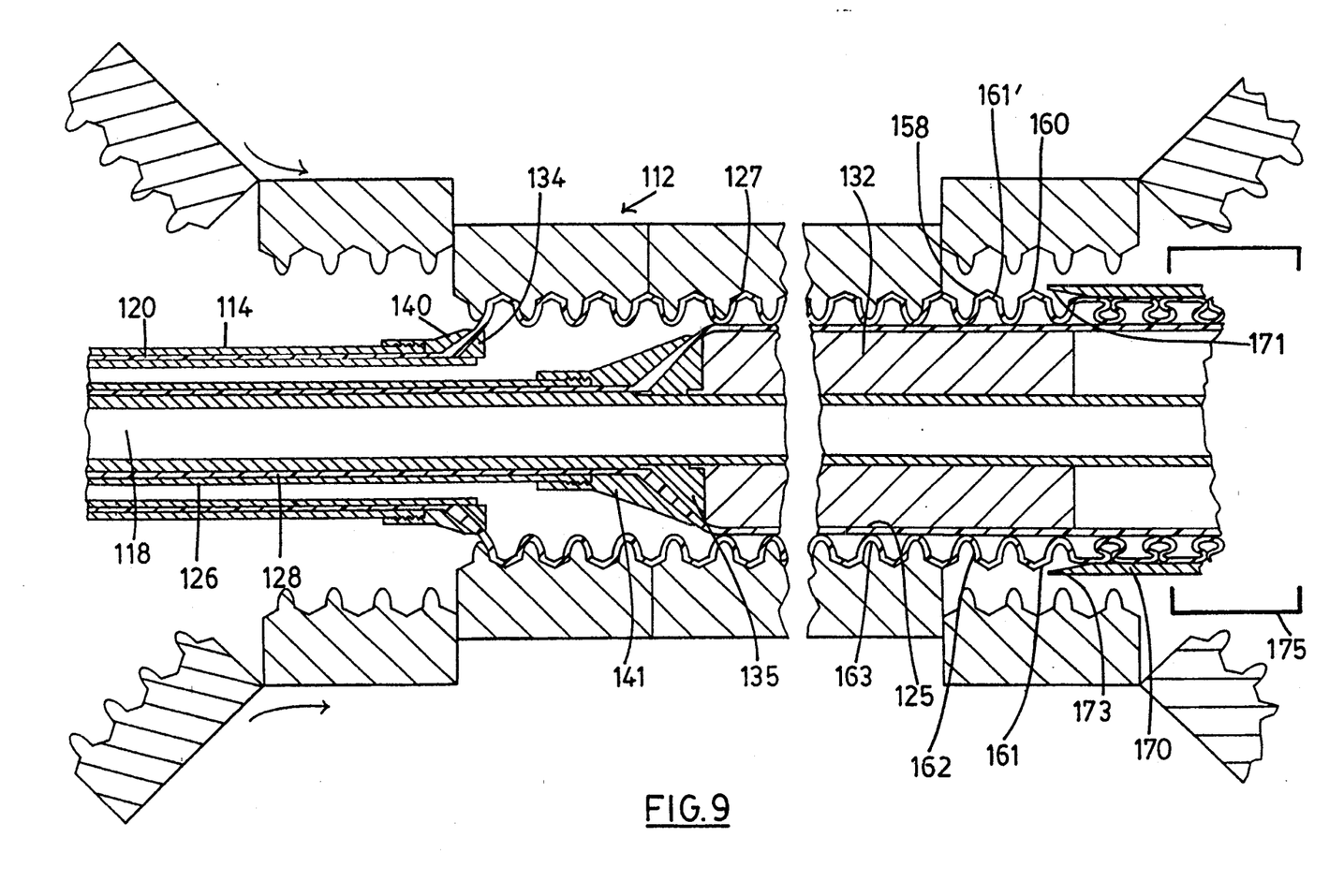
FIG. 9 is a sketch of apparatus according to the invention for forming double-walled corrugated pipe.
Figure 10:
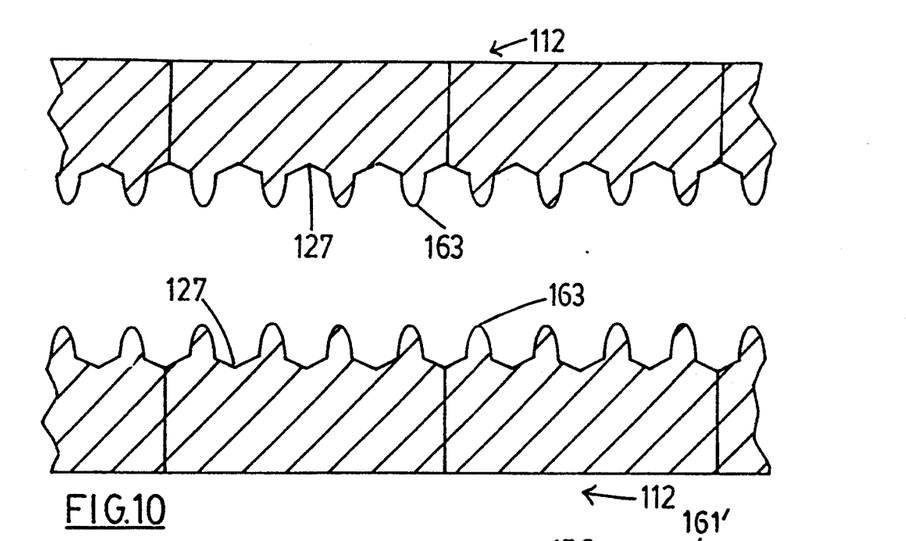
FIG. 10 shows a detail of a mold block of the apparatus of FIG. 9.

FIG. 9 shows apparatus for forming double-walled corrugated pipe which may, for example, be formed from polypropylene or polyethylene. Extrudate for molding an outer wall 127 of intermediate double-walled corrugated pipe 158 is extruded from extrusion die to a travelling mold 112 through a first outer elongate extrusion nozzle 114 located coaxially about a second inner extrusion nozzle 126 extending coaxially therethrough to define a first annular channel 120. The second inner nozzle 126 is coaxial about a carrier member 118 to define a second annular channel 128 for extrudate. The extrudate issuing from first annular channel 120 through an exit passage between exit mandrel 134 carried on inner nozzle 126 and funnel shaped member 140 may be biased towards the travelling mold tunnel by gas pressure or by vacuum forming in any suitable manner to form an outer wall 127 of intermediate corrugated pipe 158.

Second inner nozzle 126 extends forwardly out of nozzle 114 and is provided with an exit passage between exit mandrel 135 and funnel member 141. Extrudate issues from inner nozzle 126 to form a smooth inner wall 125 of intermediate pipe 158. The inner surface of the smooth inner wall is formed over sizing plug 132.

As formed intermediate pipe 158 issues from travelling mold 112, it is passed through sleeve 170 which may itself be heated in a similar manner as described for intermediate ribbed pipes 58 in sleeve 70. A cooling chamber 175 may be provided.

The intermediate pipe 158 issuing from the travelling mold may be still warm, and this affect is enhanced by the entrapment of warm air in the corrugations. Thus it is possible that the corrugations are still soft enough for deformation of the type indicated by the broken line in FIG. 11. The material from which the intermediate pipe 158 is formed, polypropylene, polyethylene, etc., may also be of influence in providing corrugations soft enough for subsequent deformation.

If preset corrugated tube is to have its section modified to form double skinned pipe having smooth inner and outer surface, care must be taken that the pipe is heated sufficiently that the corrugations are deformable over their depth.

The affect of sleeve 170 on corrugated pipe 158 is somewhat different from the affect of sleeve 70 on ribbed pipe 58. When corrugated pipe 158 passes into sleeve 170, the upstanding corrugations 160 are squashed or deformed rather than being bent over like ribs 60. The volume within corrugation 160 remains constant but the crest 161 of the corrugation is flattened or smoothed by sleeve 170 causing deformation lower in the corrugation so that its sides bulge into the adjacent troughs 163 to fill them at their upper openings. The line of deformation is marked by a broken line in FIG. 11.

It is, of course, important, if a continuous outer smooth surface is required, that the width and volume of the troughs 163 is such that squashing deformation of the crests 161 and sides 162 of the profiles 160 is sufficient to bridge the respective trough 163 at the required diameter of the final tube.

Figure 11:
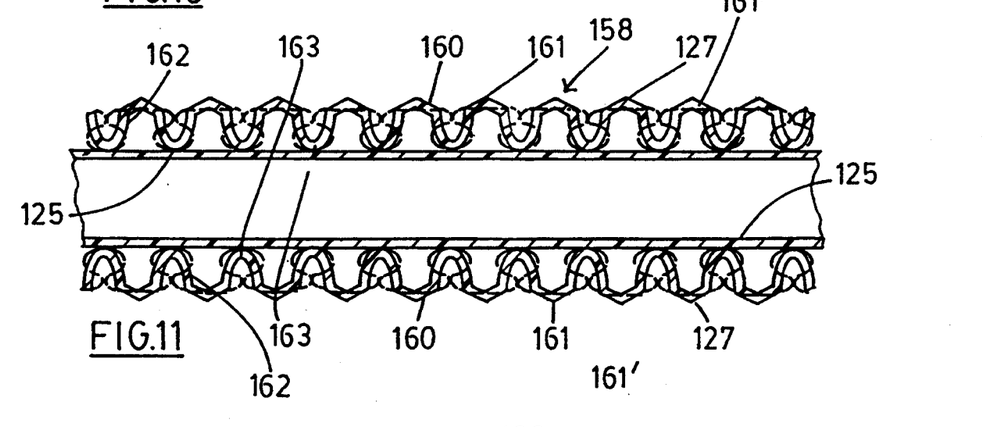
FIG. 11 is a sketch showing the line of deformation of corrugations to form smooth walled corrugated pipe.

Thus, it may be seen at least from FIG. 11 that the volume of corrugation 160 and the height of crest 161 must be such that, when pipe 158 is passed through sleeve 170 the bulges formed in sides 162 are sufficient to meet across troughs 163. This is a matter of choice according to the particular profile of corrugation and the diameter of sleeve 170 and the resulting tube. Sinusoidal corrugations may be suitable or a variety of shapes of corrugation may also be useful.

One exemplary shape of corrugation is as illustrated in FIG. 11, i.e. a corrugation having a roof shaped (inverted wide V) crest 161 and a trough 163 which is narrow with respect to the width of the corrugation 160.

Figure 12:
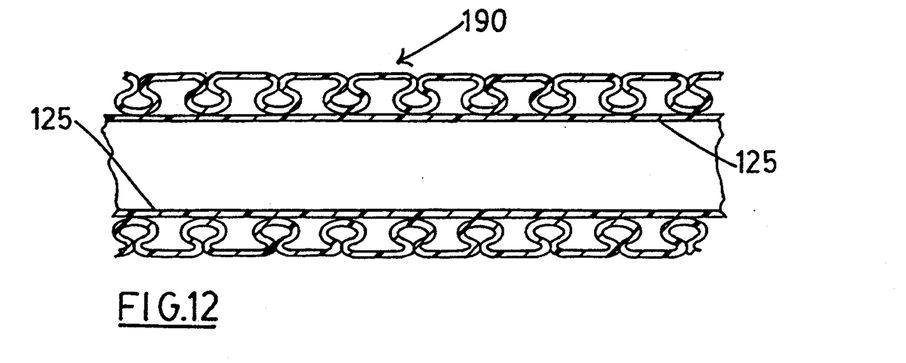
FIG. 12 is a sketch of pipe formed in the apparatus of FIG. 9.

The sloped side 161' of crest 161 slides into chamfered entrance 171 of sleeve 170 with minimum resistance to squash corrugation 160 to take the shape of FIG. 12 or the broken line of FIG. 11, to form required tube 190.

Figure 13:
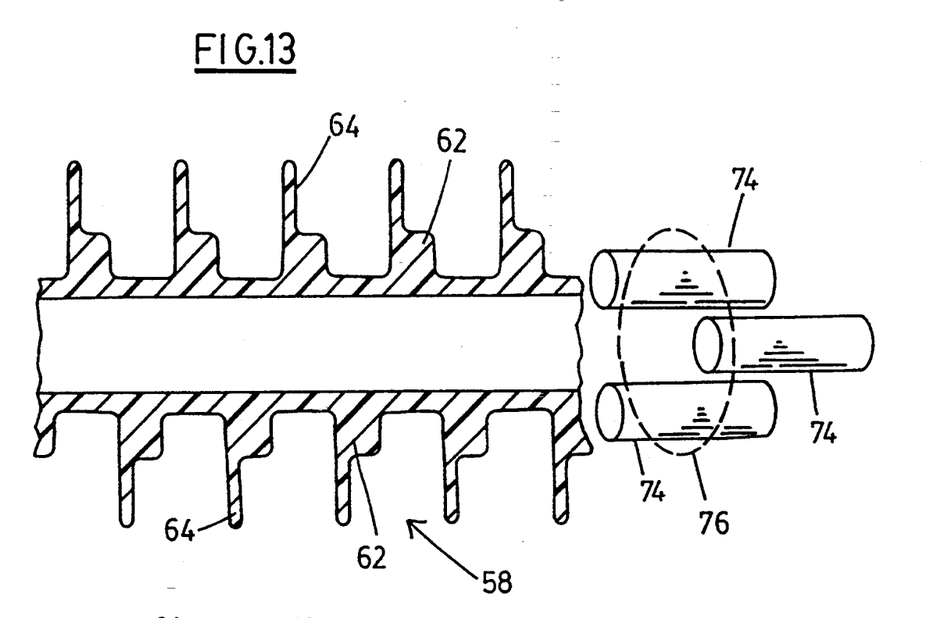
FIG. 13 is a sketch showing another means of distorting the projecting profiles.

FIG. 13 shows another means of distorting the profile of intermediate pipe. A roller or rollers, preferably three, 74 may be provided to roll the projecting profiles to distort are flatten them to the desired diameter. The embodiment is illustrated very schematically in use with helically ribbed intermediate pipe for which it is suitable. However, it is to be noted that a roller may be utilized with annularly ribbed pipe or annularly or helically ribbed corrugated pipe.

The rollers 74 roll to form the tube to a diameter 76 (indicated by a broken line) for the final tube. A mechanism for setting the track of the roller may be devised by a variety of means.

Figure 14:
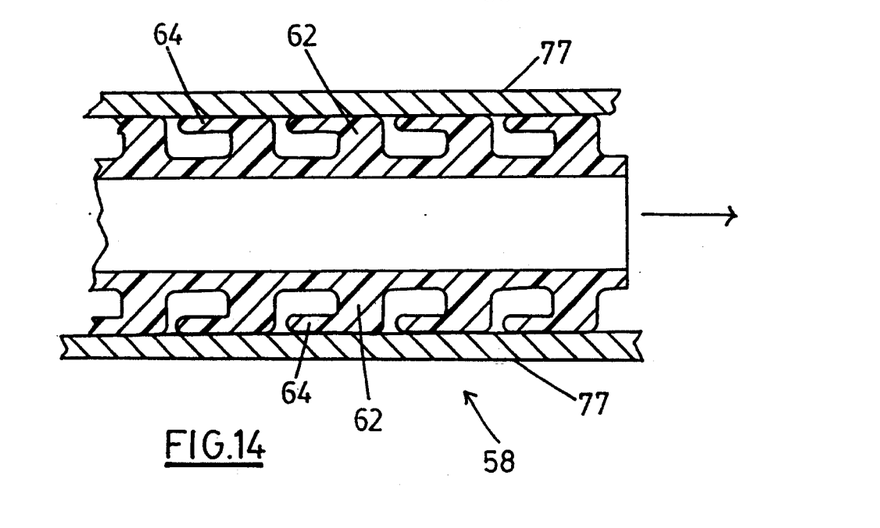
FIG. 14 is a sketch of modified double walled ribbed pipe having a smooth outer wall which is interrupted.

FIG. 14 shows a sketch of modified pipe in which the smooth outer skin is discontinuous or interrupted. In this case the rib tip portions 64 are shorter than the distance between the ribs. Such a pipe, or indeed a pipe with a continuous uninterrupted outer skin may be jacketed by an outer sleeve 77 which may be applied by a crosshead die.

I claim:

1. Apparatus for forming double-walled ribbed pipe having a smooth inner wall and an outer wall with ribs extending therebetween comprising:
    an extrusion die having an elongate extrusion nozzle coaxial about an elongate mandrel;
    a travelling mold tunnel having a mold face aligned with the extrusion nozzle and arranged to receive a parison of thermoplastic material from the nozzle on the mold face to mold an outer face of an intermediate formed pipe;
    a forming plug within the mold tunnel to mold said intermediate pipe between the plug and the mold face;
    outer pipe wall smoothing means downstream of the travelling mold tunnel to mold an outer wall of said intermediate pipe to form a double-walled pipe, the outer pipe wall smoothing means having an internal diameter generally corresponding to the desired outer diameter of the resulting double-walled pipe, the outer pipe wall smoothing means being located coaxial with the mold tunnel to receive the intermediate pipe therefrom and to form a smooth outer wall thereon.

2. Apparatus as claimed in claim 1 further comprising:
    a second elongate extrusion nozzle co-axial about said elongate mandrel and the first nozzle being coaxial about the second nozzle which extends downstream out of the first nozzle for providing a and a second parisons to form said intermediate pipe which is double-walled corrugated pipe, and where the travelling mold tunnel is arranged to receive said first parison of thermoplastic material from the first nozzle on the mold face to mold an outer wall of the intermediate double-walled corrugated pipe, the mold face being configured for molding corrugated pipe having troughs and projecting profiles, the tunnel also being arranged to receive within the outer wall of the intermediate double-walled pipe, said second parison from the second nozzle to mold an inner wall of the intermediate pipe, the mold tunnel including means to bias the first parison against the mold face and a sizing plug to mold an inner surface of the inner wall and where said outer wall smoothing means deforms the profiles.

3. Apparatus as claimed in claim 2, in which the travelling mold tunnel has a mold face to form a profile having a crest of inverted wide V-shape and a trough having a width less than that of the profiles.

4. Apparatus as claimed in claim 2, in which said outer wall smoothing means is a sleeve.

5. Apparatus as claimed in claim 2, in which said outer wall smoothing means comprise at least one roller.

6. Apparatus as claimed in claim 1, where the intermediate pipe is single-walled and the configuration of the mold face has annular grooves, the grooves having a thickness and depth to mold an upstanding rib of the said single-walled pipe, the rib comprising a rib root portion having a diameter generally corresponding to the diameter of the resulting double-walled pipe, and a tip portion of a thickness to form an outer wall of the resulting doubled-walled pipe and a depth corresponding at least to the distance between adjacent ones of said grooves whereby the tip rib portions are bent to form the smooth outer wall.

7. Apparatus as claimed in claim 6, in which each annular groove has a rib forming root portion which is thicker than its outer wall forming tip rib portion.

8. Apparatus as claimed in claim 6, in which the depth of each rib forming root portion and the depth of each outer wall forming tip portion are generally similar.

9. Apparatus as claimed in claim 6, in which the outer wall tip rib portion is located on the upstream end of the rib forming root portion.

10. Apparatus as claimed in claim 6, in which said outer wall smoothing means is a sleeve.

11. Apparatus as claimed in claim 6, in which said outer wall smoothing means comprise at least one roller.

12. Apparatus as claimed in claim 6, including cooling means at least partially downstream of the smoothing means.

13. A method for forming double-walled ribbed pipe comprising:
    extruding a tubular parison of thermoplastic material from an extrusion die through an elongate extrusion nozzle coaxial about an elongate mandrel into a travelling mold tunnel having a mold face aligned with the extrusion nozzle;

molding the material between the mold face and a forming plug within the mold tunnel to mold an intermediate pipe;

passing the intermediate pipe through an outer wall smoothing member which has an internal diameter generally corresponding to the outer diameter of the resulting double-walled pipe and being located coaxial with the mold tunnel to receive the tube therefrom to form a smooth outer wall of the double-walled pipe.

14. The method of claim 13 where the formed intermediate pipe is a single walled ribbed pipe and the configuration of the mold face has annular grooves, the grooves having a thickness and depth to mold an upstanding rib of intermediate single-walled pipe, the rib comprising a rib root portion having a diameter generally corresponding to the diameter of a required double-walled pipe, and a tip portion of a thickness to form an outer wall of the required double-walled pipe and a depth corresponding at least to the distance between adjacent ones of said grooves, and where the outer pipe wall smoothing member is a sleeve, the method further comprising the step of bending.

15. A method as claimed in claim 13 where the outer wall smoothing member is a sleeve, further comprising the steps of extruding a second tubular parison of thermoplastic material from an extrusion die through a second elongate extrusion nozzle which extends downstream out of the first nozzle, to form a double walled intermediate pipe, molding the first parison of the intermediate double-walled corrugated pipe, the mold face being configured for molding pipe having troughs and projecting profiles;

molding the second parison between the molded first parison and a sizing plug to mold an inner wall of the intermediate pipe, passing the intermediate pipe into the sleeve to mold an outer wall of the finished double-walled pipe, to deform the profiles.

* * * * *